United States Patent [19]

Guazzoni

[11] 4,097,654

[45] Jun. 27, 1978

[54] THERMAL SHUNT FOR RADIOISOTOPE THERMOELECTRIC GENERATOR-CHEMICAL BATTERY HYBRID CONFIGURATION

[75] Inventor: Guido Eddardo Guazzoni, Wayside, N.J.

[73] Assignee: The United States of America as represented by the Secretary of the Army, Washington, D.C.

[21] Appl. No.: 787,413

[22] Filed: Apr. 14, 1977

[51] Int. Cl.² .......................................... H01M 14/00
[52] U.S. Cl. .......................................... 429/5; 429/9; 429/99; 429/120
[58] Field of Search ................... 429/9, 5, 96, 99, 100, 429/120, 176; 136/202

[56] References Cited

U.S. PATENT DOCUMENTS

| | | | |
|---|---|---|---|
| 3,515,592 | 6/1970 | Nishimura | 429/6 |
| 3,537,907 | 11/1970 | Wilson | 429/120 |
| 3,837,918 | 9/1974 | Nakabayashi | 429/120 X |
| 3,918,460 | 11/1975 | King et al. | 429/99 X |

Primary Examiner—Charles F. LeFevour
Attorney, Agent, or Firm—Nathan Edelberg; Sheldon Kanars; Edward Goldberg

[57] ABSTRACT

A thermal shunt is provided to recover the rejected heat from a radioisotope thermoelectric generator utilized in a hybrid configuration with a chemical battery to maintain the chemical battery at a temperature above the environmental ambient temperature.

5 Claims, 5 Drawing Figures

U.S. Patent   June 27, 1978   4,097,654
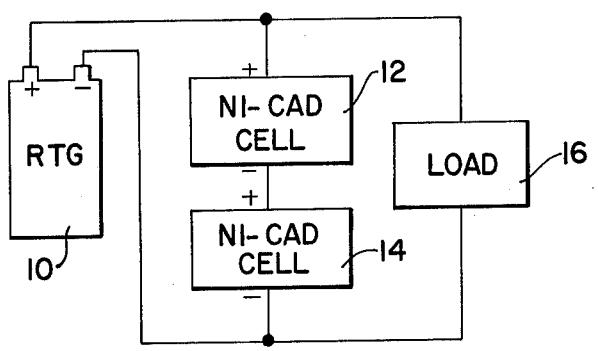
FIG. 1
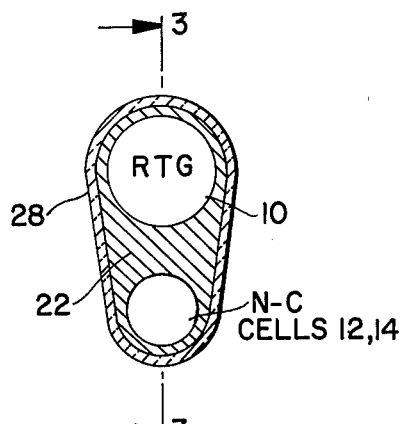
FIG. 2
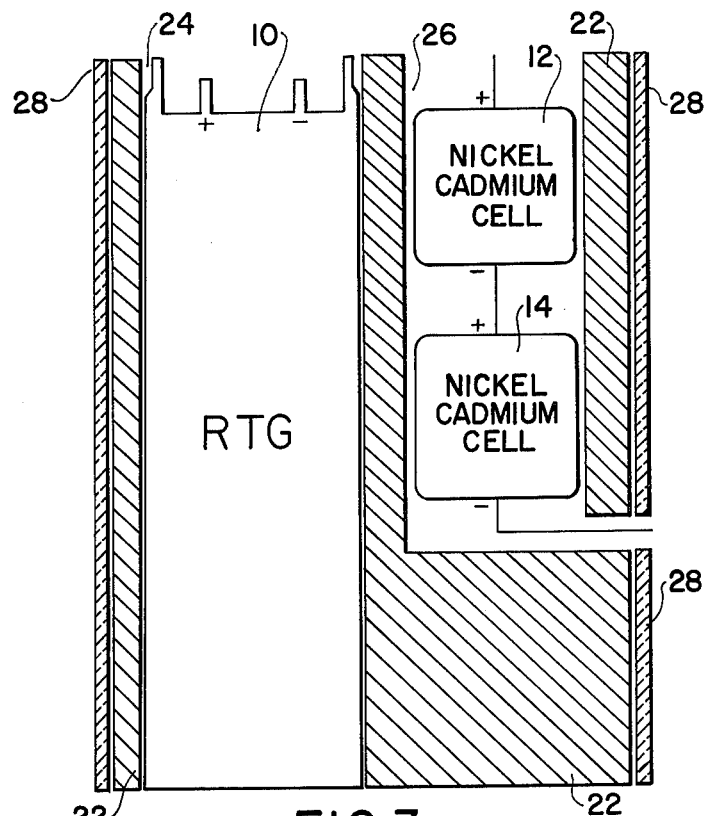
FIG. 3
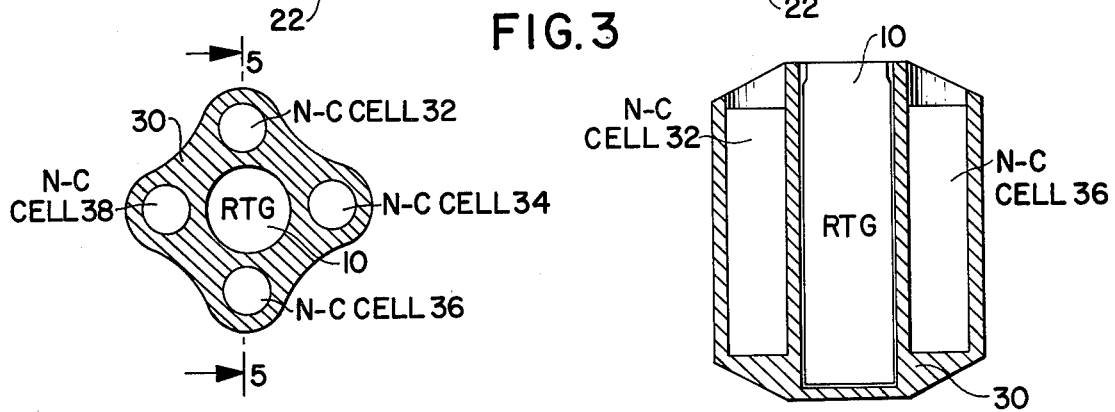
FIG. 4
FIG. 5

THERMAL SHUNT FOR RADIOISOTOPE THERMOELECTRIC GENERATOR-CHEMICAL BATTERY HYBRID CONFIGURATION

The invention described herein may be manufactured and used by or for the Government for governmental purposes without the payment of any royalties thereon or therefor.

BACKGROUND OF THE INVENTION

This invention relates to a hybrid configuration utilizing nuclear and chemical batteries and, more particularly, to a thermal shunt packaging arrangement for such configuration.

Nuclear battery devices, also called radioisotope thermoelectric generators, or RTG's, have the highest stored energy density of any known power source. Such devices utilize the nuclear particle emission energy of radioactive decay to set up a temperature differential which an array of thermocouples converts into electrical energy. Although such batteries have a very long life, limited by the life of the radioisotope, which in the case of plutonium-238 is an 86 year half life alpha emitter, nuclear batteries are generally characterized by relatively low power output.

In certain applications, it is desirable to have an extremely long-lived source of power which is subjected to pulsed loads having higher intermittent peak power than that which an RTG can provide. Under such circumstances, the feasibility of utilizing an RTG-chemical battery hybrid configuration is extremely advantageous. Such a configuration would illustratively comprise an RTG in parallel connection with one or more rechargeable chemical batteries such as sealed quick charge nickel-cadmium cells. During non-load periods, the constant current low power characteristics of the RTG are utilized to maintain the chemical batteries in a full charge status. During periods of pulsed load, the chemical batteries are capable of supplying high intermittent power. In order to sustain the chemical battery in its full charge status, the RTG must have a higher power capability than the average power supplied by the chemical battery to the pulsed load. This requires a matching of the particular RTG and chemical batteries which are paired together.

Testing of the aforedescribed hybrid configuration has demonstrated that the operational capability of the hybrid configuration could not be extended below a certain environmental ambient temperature value because of the reduced capacity of the chemical battery to accept charge below that temperature. Charge acceptance of nickel-cadmium batteries was found to be strongly reduced at environmental ambient temperatures below minus 25° C, with a consequent considerably higher continuous power requirement from the RTG to maintain the battery in its full charge status. At such low environmental ambient temperatures, this higher power requirement was found to exceed the RTG's operational performance capability and thus the chemical battery became incapable of supplying the high peak power periodically required by the pulse load. The RTG operates more efficiently at low environmental ambient temperatures and the nickel-cadmium battery operates more efficiently at higher environmental ambient temperatures.

It is therefore an object of the present invention to maximize the operating efficiency and to extend the operational temperature range of an RTG-chemical battery hybrid configuration, by recovering the waste heat from the RTG and by utilizing this waste heat to maintain the chemical battery at a working temperature higher than the environmental ambient temperature.

SUMMARY OF THE INVENTION

The foregoing and additional objects are attained in accordance with the principles of this invention by providing a holder for an RTG and associated chemical batteries utilized in a hybrid configuration, the holder acting as a thermal shunt to recover rejected heat from the RTG to maintain the chemical battery at a temperature above the environmental ambient temperature.

BRIEF DESCRIPTION OF THE DRAWING

The foregoing will be more readily apparent upon reading the following description in conjunction with the drawing in which:

FIG. 1 depicts a block electrical schematic diagram of an RTG-chemical battery hybrid configuration in which the principles of this invention may be applied;

FIG. 2 depicts an end view of a holder for an RTG-chemical battery hybrid configuration constructed in accordance with the principles of this invention;

FIG. 3 is a cross-sectional view taken along the line 3—3 of FIG. 2;

FIG. 4 depicts an end view of a second embodiment of a holder for an RTG-chemical battery hybrid configuration constructed in accordance with the principles of this invention; and FIG. 5 is a cross-sectional view taken along the line 5—5 of FIG. 4.

DETAILED DESCRIPTION

Referring now to FIG. 1, depicted therein is a block electrical schematic diagram of an RTG-chemical battery hybrid configuration. RTG 10 is in parallel circuit configuration with chemical batteries 12 and 14, illustratively sealed quick charge nickel-cadmium cells. A load 16 is connected across RTG 10 and chemical batteries 12 and 14. The constant current low power characteristics of RTG 10 maintain chemical batteries 12 and 14 in a full charge condition. When load 16 requires an intermittent pulse of power, chemical batteries 12 and 14 are able to supply same. During the period between those power pulses, RTG 10 restores to batteries 12 and 14 the charge lost during the power pulse.

A thermoelectric generator operates by setting up a temperature differential, or gradient, across a thermocouple element which in response to the temperature differential provides electrical power. The greater the temperature gradient, the greater the electrical power output. RTG 10 is a cylindrically shaped unit whose energy source is a radioisotope pellet positioned within the cylindrical casing of RTG 10 and in thermal contact with an array of thermocouples. The pellet gives off heat due to the nuclear decay of the radioisotope. The temperature gradient which causes the array of thermocouples to provide power is set up between the temperature of the pellet and the environmental ambient temperature at the surface of RTG 10. Since more power is generated the greater the temperature gradient, it follows that RTG 10 will operate more efficiently at lower environmental ambient temperatures. On the other hand, nickel cadmium cells 12 and 14 have been found not to accept a full charge below a certain environmental ambient temperature. This presents a conflict of operating environments for the hybrid configuration shown in FIG. 1.

As a member of the thermoelectric power source family, RTG 10 is characterized by a relatively low conversion efficiency on the order of approximately 3 percent. This means that 97 percent of the thermal heat supplied by the heat source within RTG 10 is wasted by dissipation from the surface of RTG 10.

To extend the operational capability of an RTG-chemical battery hybrid configuration to a wider range of low environmental ambient temperatures, the holder shown in FIGS. 2 and 3 has been designed. This holder is operative to divert the heat given off from the surface of RTG 10 to the chemical batteries 12 and 14. The holder shown in FIGS. 2 and 3 comprises a thermally conductive material, for example, aluminum, formed as a block having longitudinal cavities 24 and 26 for holding the RTG 10 and chemical batteries 12 and 14. Block 22 functions as a thermal shunt to conduct heat rejected from the surface of RTG 10 and direct this heat to batteries 12 and 14. Such an arrangement is found to maintain the temperature of the cases of batteries 12 and 14 approximately 18° C higher than the environmental ambient temperature. This permits successful operation of the hybrid configuration down to minus 43° C environmental ambient temperature.

To improve the efficiency, a layer 28 of thermal insulation is provided to surround block 22. In addition, a highly thermal conductive oil, for example, silicone oil, could be used to fill the spacing between RTG 10, batteries 12 and 14, and block 22.

The specific holder shown in FIGS. 2 and 3 was designed based upon the particular sizes and shapes of RTG 10 and nickelcadmium cells 12 and 14. If a chemical battery with a different geometry, for example having a larger length/diameter ratio, were utilized, a different design of the thermal shunt conductor block would be utilized. For example, FIGS. 4 and 5 depict a thermal shunt conductive block utilized to hold RTG 10 and four chemical batteries 32, 34, 36 and 38 utilized in a hybrid configuration similar to that shown in FIG. 1. In this embodiment, the cavities holding batteries 32, 34, 36 and 38 are arranged radially about and disposed at equal distances from said first cavity.

It is understood that the above-described arrangements are merely illustrative of the application of the principles of this invention. Numerous other arrangements may be devised by those skilled in the art without departing from the spirit and scope of this invention, as defined by the appended claims.

What is claimed is:

1. An assembly including a holder and a plurality of electrical energy sources in said holder for supplying a load, said sources having different thermal characteristics comprising:
a block of thermally conductive material having a first cavity accommodating a radioisotope thermal electric generator having a first thermal characteristic and a second cavity accommodating a chemical battery having a second thermal characteristic, said cavities being surrounded by said block, and a layer of thermal insulation disposed on and surrounding said block, said insulation layer trapping heat therein and said block directing heat between said different sources having said different thermal characteristics.

2. The holder of claim 1 further including a thermally conductive liquid in said first and second cavities surrounding said sources therein.

3. The holder according to claim 2 wherein said thermally conductive liquid is silicone oil.

4. The holder according to claim 1 including a plurality of chemical batteries connected together and said second cavity comprises a plurality of openings in said block, each opening accommodating one of said plurality of chemical batteries, said plurality of openings being arranged radially about and disposed at equal distances from said first cavity.

5. The holder of claim 1 wherein said first and second sources are connected in parallel for supplying electrical energy to a load.

* * * * *